United States Patent
Divisi

(10) Patent No.: US 11,098,848 B2
(45) Date of Patent: Aug. 24, 2021

(54) SYSTEM FOR DISTRIBUTING SEMISOLID LUBRICANT AND METHOD OF CONTROLLING SUCH A SYSTEM

(71) Applicant: DROPSA S.p.A., Milan (IT)

(72) Inventor: Walter Divisi, Monaco (MC)

(73) Assignee: DROPSA S.p.A., Milan (IT)

( * ) Notice: Subject to any disclaimer, the term of this patent is extended or adjusted under 35 U.S.C. 154(b) by 734 days.

(21) Appl. No.: 15/725,806

(22) Filed: Oct. 5, 2017

(65) Prior Publication Data

US 2018/0100619 A1    Apr. 12, 2018

(30) Foreign Application Priority Data

Oct. 7, 2016    (IT) .................. 102016000100783

(51) Int. Cl.
| | | |
|---|---|---|
| *F16N 7/38* | (2006.01) | |
| *F16N 29/00* | (2006.01) | |
| *F16N 19/00* | (2006.01) | |
| *F16N 27/00* | (2006.01) | |

(52) U.S. Cl.
CPC ............ *F16N 7/385* (2013.01); *F16N 29/00* (2013.01); *F16N 19/00* (2013.01); *F16N 27/00* (2013.01); *F16N 2200/12* (2013.01); *F16N 2250/04* (2013.01); *F16N 2260/24* (2013.01); *F16N 2260/40* (2013.01); *F16N 2270/62* (2013.01)

(58) Field of Classification Search
CPC ............ F16N 7/385; F16N 7/38; F16N 29/00
USPC .......................................................... 184/7.4
See application file for complete search history.

(56) References Cited

U.S. PATENT DOCUMENTS

| | | | | |
|---|---|---|---|---|
| 2,328,812 A | * | 9/1943 | Klein | F01L 25/08 |
| | | | | 417/28 |
| 2,498,407 A | * | 2/1950 | Fine | F16N 7/385 |
| | | | | 184/7.4 |
| 2,776,728 A | * | 1/1957 | Fuchs | F16N 7/385 |
| | | | | 184/6.1 |

(Continued)

FOREIGN PATENT DOCUMENTS

| | | |
|---|---|---|
| EP | 0159580 A2 | 10/1985 |
| JP | H04366095 A | 12/1992 |

OTHER PUBLICATIONS

Search Report and Written Opinion dated Jun. 28, 2017 for Italian patent application No. 102016000100783.

*Primary Examiner* — Michael R Mansen
*Assistant Examiner* — Mark K Buse
(74) *Attorney, Agent, or Firm* — Vorys, Sater, Seymour and Pease LLP

(57) ABSTRACT

A system for distributing semisolid lubricant, including a semisolid lubricant tank and a high pressure pumping system that intermittently feeds, during a lubrication cycle, at least one first duct, the at least one first duct feeding a plurality of distributors adapted to sort the semisolid lubricant to a plurality of users; a controlled suction/delivery device, fluidly associated with the first duct, for controlled suction/delivery of a part of the semisolid lubricant conveyed by the first duct. The controlled suction/delivery device configured to suck a volume of semisolid lubricant from the first duct during a step of inactivity of the pumping system on the first duct, and to introduce the previously suctioned semisolid lubricant in the first duct during a step of activity of the pumping system on the first duct.

10 Claims, 4 Drawing Sheets

(56) References Cited

U.S. PATENT DOCUMENTS

| | | | | |
|---|---|---|---|---|
| 3,995,717 A | * | 12/1976 | Kroffke | F16N 7/385 |
| | | | | 184/7.4 |
| 5,193,646 A | * | 3/1993 | Horikawa | F16N 7/385 |
| | | | | 137/883 |
| 8,978,825 B2 | * | 3/2015 | Conley | F16N 7/385 |
| | | | | 184/6 |
| 9,920,878 B2 | * | 3/2018 | Beck | F16N 7/385 |
| 2002/0100639 A1 | * | 8/2002 | Miller | F16N 7/385 |
| | | | | 184/26 |
| 2009/0193965 A1 | * | 8/2009 | Paluncic | F16N 25/02 |
| | | | | 92/61 |
| 2010/0219020 A1 | * | 9/2010 | Knox | B65G 45/02 |
| | | | | 184/7.4 |
| 2012/0145482 A1 | * | 6/2012 | Ifield | F16N 7/385 |
| | | | | 184/6 |
| 2013/0277148 A1 | * | 10/2013 | Beck | F16N 29/02 |
| | | | | 184/6.4 |

\* cited by examiner

SYSTEM FOR DISTRIBUTING SEMISOLID LUBRICANT AND METHOD OF CONTROLLING SUCH A SYSTEM

This claims the benefit of Italian patent application no. 102016000100783, filed Oct. 7, 2016.

FIELD OF THE INVENTION

The present invention relates to a system for distributing semisolid lubricant and to a method of controlling such a system.

In particular, it relates to a distribution system with volumetric injectors, or to a double line system or in general to any lubrication system requiring at least one depressurization step to recharge the dispensing devices of the system, or a part thereof, between successive pressurization cycles.

BACKGROUND

Various systems are known in the field of lubrication systems, which dispense semisolid lubricant, in particular grease or fluid grease. Using these types of lubricants could often result in problems of saponification of the grease which, transforming the grease into solid components, create obstructions and malfunctions of the lubrication lines.

The problem of grease saponification is strongly felt in systems provided with volumetric injectors or double line systems, especially when there is a significant distance between the point at which the high-pressure pump is positioned and the final distribution points of the lubricant.

In fact, as is known, the types of systems mentioned above work according to pressurization and depressurization cycles of ducts and tubing. If the systems are provided with very long pipes, the depressurization step is not homogeneous and parts of the pipes may already be depressurized, while others are still under pressure.

This is due to the density of grease which, especially in the presence of saponification phenomena, acts as a 'cap' and temporarily blocks the pipes, thus preventing a quick depressurization thereof.

Moreover, the more time the grease remains at high pressure inside the systems, the greater the risk of saponification phenomena.

Another problem related to the above systems is the time required by the system itself to depressurize. In fact, it is not unusual that, once the pressurization that normally has a fairly short duration has ended, one must wait even more than half an hour for the pressure to drop below the values necessary to proceed to a new pressurization cycle. This also happens in the absence of saponification phenomena, prevented by the use of a high-quality semisolid lubricant.

The problem of long cycle times is particularly felt during the system filling steps. It often happens that the filling of very large systems can continue for days. This is mainly due to the 'idle' waiting times for the depressurization step.

SUMMARY OF THE INVENTION

The object of the present invention is to provide a lubrication system with semisolid lubricant and a control method of such a system which solve the technical problems of the prior art.

A further object of the invention is to provide a system and a method that would decrease the timing related to the depressurization step of known systems.

Yet another object of the present invention is to provide a system and a method allowing a reduction also of the pressurization time of the system.

A further object of the invention is to minimize the saponification phenomena of the semisolid lubricant.

This and other objects are achieved by a system and a method according to the technical teachings of the appended claims.

BRIEF DESCRIPTION OF THE FIGURES

Further features and advantages of the invention will become apparent from the description of a preferred but non-exclusive embodiment of the device, shown by way of a non-limiting example in the accompanying drawings, in which.

DETAILED DESCRIPTION OF THE INVENTION

Figure 1:
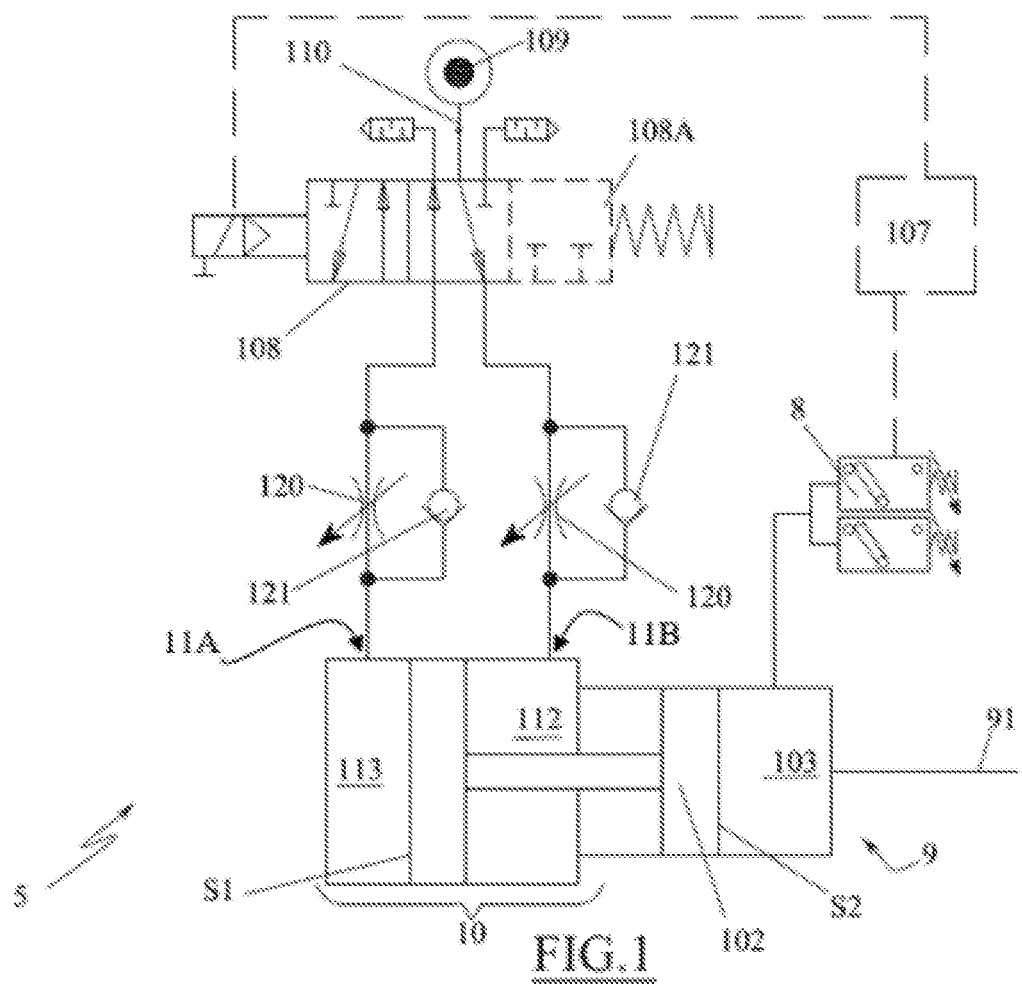
FIG. 1 is a schematic view of a controlled suction/delivery device of semisolid lubricant according to the present invention.

With reference to the above figures, a lubrication system is shown, globally denoted by reference numeral 1A or 1B.

Figure 2:
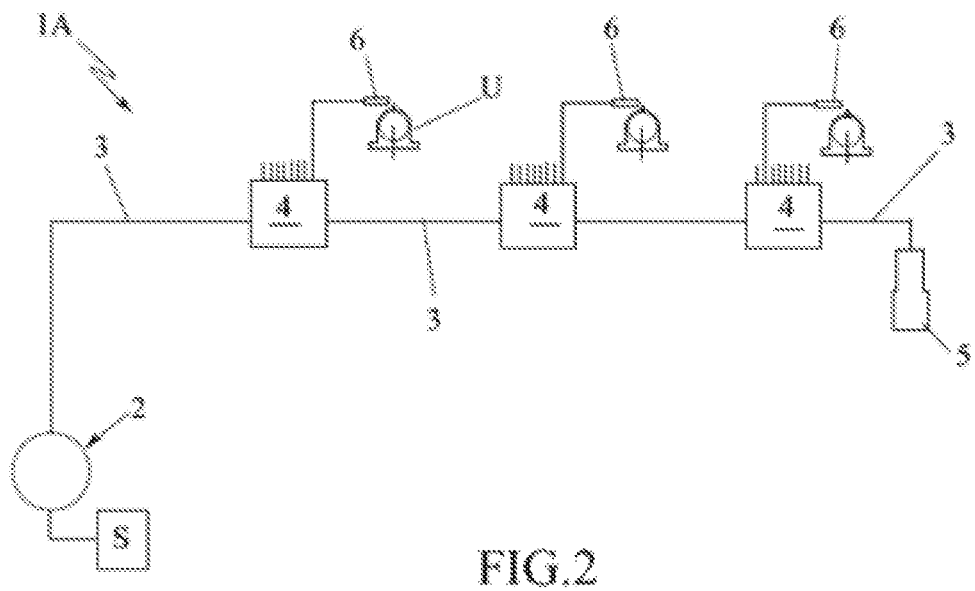
FIG. 2 is a schematic view of a first type of system of the present invention integrating the device in FIG. 1.

FIG. 2 schematically shows a system 1A for distributing a semisolid lubricant. In this text, semisolid lubricant may denote grease of fluid grease for industrial use.

System 1A comprises a tank S for said semisolid lubricant. The tank is functionally connected to a high pressure pumping system 2. The high pressure pumping system 2 may comprise a high pressure pump, which for example has a delivery pressure greater than 50 bar, and normally in the range between 50 and 150 bar. The pump advantageously is of the volumetric type. It intermittently feeds, during a lubrication cycle, at least a first lubricant duct 3.

The first duct 3 is connected (and thus in turn feeds) a plurality of distributors 4, 4A placed in series on duct 3 itself. Each distributor has a plurality of outlets placed in parallel, each associated with a volumetric injector 6. Injectors 6 may also be mounted directly on the distributor (which in this case may also be defined as divider) or they may be mounted in the vicinity of a user and connected to the distributor through appropriate pipes 20.

Distributors and volumetric injectors are known in the industry, and particularly the latter can have different configurations.

As an example, the injectors may be those marketed by Dropsa S.p.A. with the initials 33V. One of them is schematized in FIG. 6, and the operation thereof is briefly explained conceptually hereinafter. Other known volumetric injectors, while having different technical solutions, use the same working principle which is substantially to use the pressure (and the flow) incoming to the injector to deliver a (sometimes adjustable) predetermined volume of grease in a discrete manner. In essence, the volumetric dispensing of the injector is activated by the flow of lubricant semisolid at its inlet.

Figure 6:
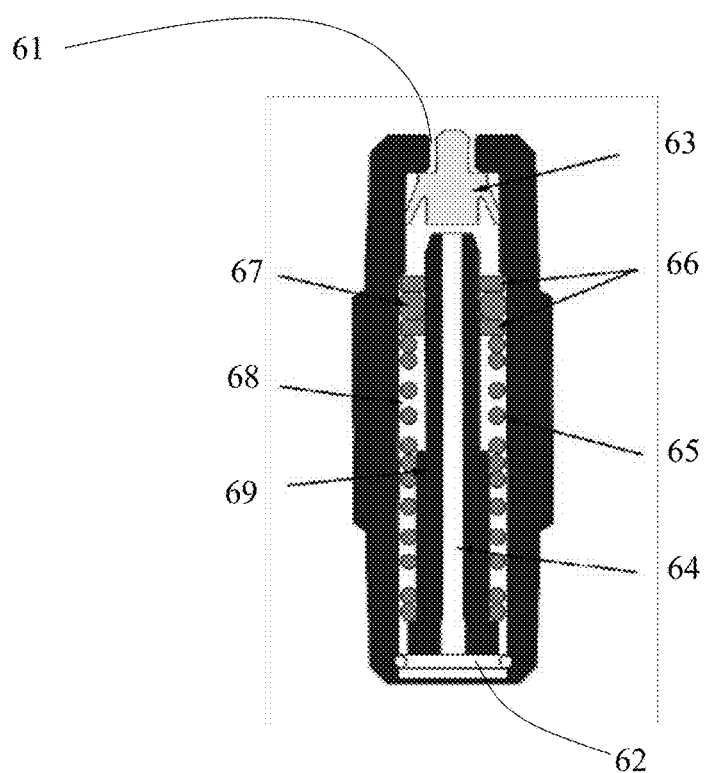
FIG. 6 is a view of a volumetric distributor of the system in FIG. 2.

The operation of the volumetric injector in FIG. 6 is as follows.

When the inlet pressure 61 increases, the grease under pressure overcomes the back pressure on the outlet line 62 and pushes down the head gasket 63, which closes the central channel 64. The grease draws at the sides of the head gasket, thereby pushing down, in contrast to spring 65 mounted around the hollow insert 69, rings 66 and gasket 67. This movement allows the emptying of the annular dosing chamber 68, thus dispensing the volume of grease contained therein to the users.

When the pressure on the feeding line 61 (fluidically connected to the first duct 3) drops, the back pressure closes inlet 61 of the lubricant through an upward movement of the head gasket 63. Spring 65 stretches, thus pushing rings 66 and gasket 67 upwards.

The lubricant present above gasket 67 flows through the central channel 64, comes out from the bottom and is sucked into the annular dosing chamber 68 for the next cycle.

In essence, each lubrication cycle of a conventional system (dotted line in FIG. 3) provides for a first step in which pump 2 is active and introduces lubricant under pressure into duct 3. The pressure in the line rises quickly up to pressure Pe, thus overcoming the friction and compensating for any little vacuums in the system. At pressure Pe (activating the injectors), the pressure rises more slowly and at this stage the injectors dispense the grease, overcoming the resistance of their internal springs. At the end of the dispensing phase of all the injectors (at pressure Pte), a sharp raising of pressure occurs up to a stabilization value Ps. When the system is stable at the stabilization pressure Ps for a predetermined time, pump 2 is deactivated and the pressure begins to drop slowly according to curve C.

According to the present invention, fluidically connected to channel 3 and preferably far from pump 2, there is a controlled suction/delivery device 5 of a part of the semisolid lubricant conveyed by said first duct 3. It is configured to suck from said first duct a semisolid lubricant volume during an inactivity step of the pumping system 2 on said first duct 3, 3A, and to introduce the semisolid lubricant previously suctioned in said first duct during an inactivity step of the pumping system 2 on said first duct 3, 3A.

A possible embodiment of device 5 is schematically shown in FIG. 1, and exploded in a stand-alone configuration shown in FIG. 6.

It may comprise an accumulation cylinder 9 actuated by a movement system 10. The movement system may be of any type (pneumatic 10, down-steering electric motors, etc.) adapted to move the accumulation cylinder so as to supply at an input/output 91 thereof a maximum pressure comparable to the maximum one supplied by pump 2 (i.e. at the stabilization pressure Ps) or slightly lower with respect to it (for example, from 3 to 15 bar lower than the maximum pressure of the pump).

Figure 7:
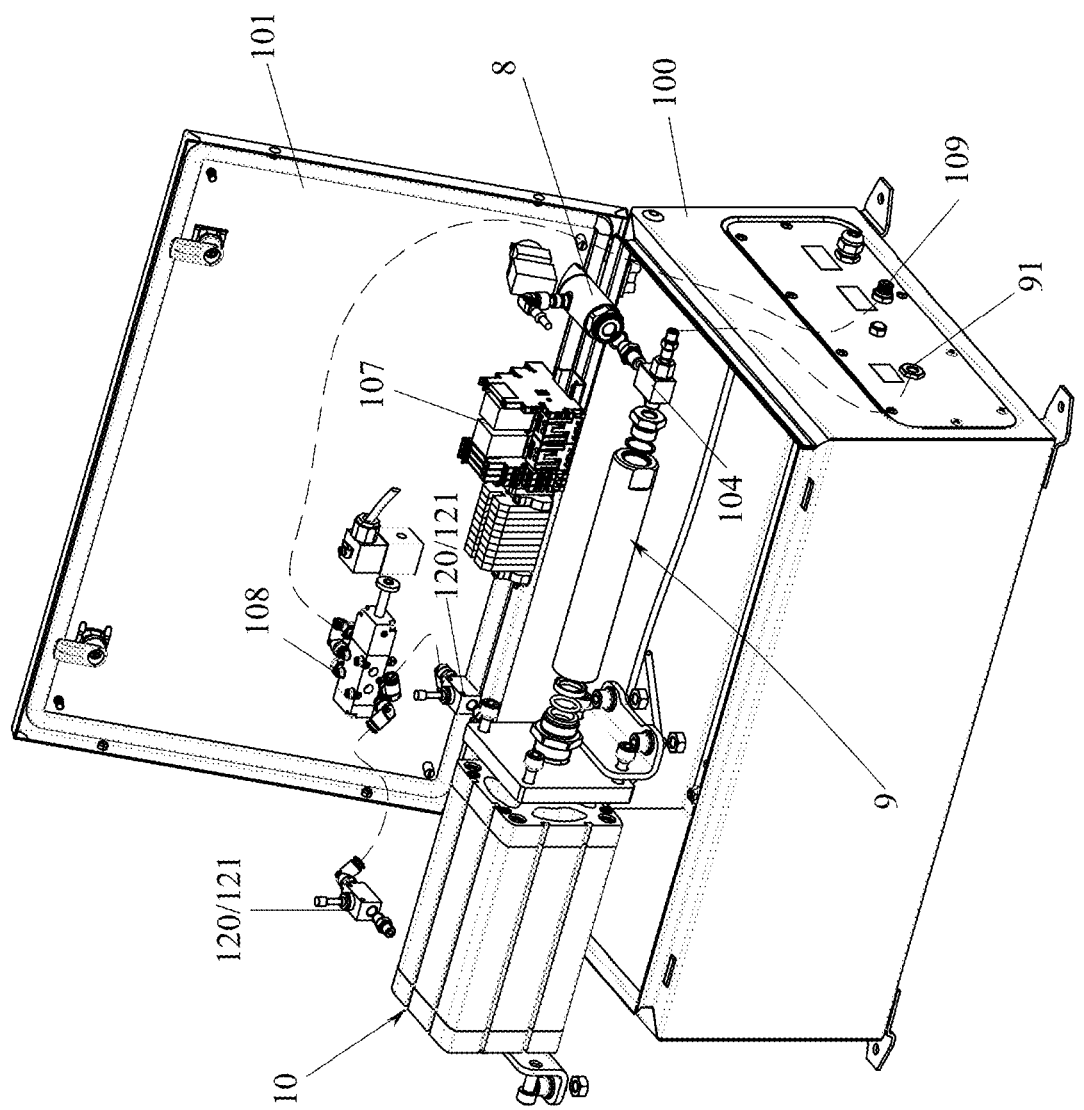
FIG. 7 is a simplified perspective exploded view of the component in FIG. 1.

A particularly advantageous solution for the industry is the one shown in FIG. 7, where the movement system is pneumatically operated. Advantageously, the ratio between surface S2 of the accumulation cylinder 9 and surface S1 of the pneumatic cylinder 10 is comprised between 1:15 and 1:35, preferably of 1:25.

This allows actuating the pneumatic cylinder with compressed air at a pressure of about 6 bar, usually already available in industrial contexts where system 1A is normally applied. In this way, the final delivery pressure supplied by the accumulation cylinder 9 is around 150 bar.

The suction/delivery device 5 described above may comprise a box housing 100 which can be opened using a lid 101. The box housing contains the pneumatic cylinder 10 provided with a stem 102 sealably sliding in a chamber 103 of the accumulation cylinder to act as a piston. Chamber 103 is in fluid passage communication with the inlet/outlet 91, which in use is fluidically connected with channel 3.

Connected to the inlet/outlet 91 may be provided a T fitting 104 an outlet of which is associated with a first pressure sensor 8, which may be a pressure switch.

In the configuration described, therefore, when device 5 is inserted in the system, the pressure sensor 8 is fluidically associated with said first duct 3. Of course, in alternative embodiments the sensor may also be placed directly on duct 3 or in other positions of the system (such as on a distributor).

The pressure sensor 8 may be associated with a control unit 107, in turn interfaced with a valve element 108 (e.g. of the drawer type) to control the pneumatic cylinder.

The valve element 108 is fed by compressed air through a port 109 available on the box element 100 connected to the latter by suitable pipes 110.

The valve element 108 may have, in a conventional manner, at least two operating positions; one in which a first chamber 112 is fed so as to retract piston 12 in the cylinder, and one in which a second chamber 103 is fed to eject piston 102 from the pneumatic cylinder.

Each chamber, advantageously through a first and a second pressurization port 11A, 11B of the pneumatic cylinder, may be associated with a flow regulator 120 and/or a unidirectional valve 121 advantageously arranged in parallel.

The flow regulator 120 has the function of slowing down the air inlet from the non-pressurized chamber, so as to adjust the movement speed of piston 102. The unidirectional valve 121 opens in an outlet direction of compressed air from the cylinder. Of course, it is also possible to adjust the air outlet from the piston chambers. In this case, the unidirectional valve 121 will be reversed.

The valve element 108 may be provided with a further operating position defined by the presence of module 108A. In such a position, chambers 112 and 113 of the pneumatic piston are isolated and the air present in the chamber acts as a 'shock absorber' for the piston movement 102 when loaded by the grease present in duct 3.

To end the description of the system in FIG. 2, it should be noted that the delivery/suction device 5 may be placed in direct or indirect fluid communication with duct 3, in a position far from the pumping means 2, and for example at one end of duct 3 opposite that in which the pumping means 2 are placed. Device 5 may also be advantageously placed between two distributors or dividers 4. Multiple devices 5 may also be associated with duct 3 as needed. For example, a device 5 may be positioned every L meters (for example L=50 m or other suitable distance, such as between 30 and 80 m) of piping, or every number D of injectors (such as every 20 injectors or another suitable number of injectors, such as between 15 and 35 injectors).

The operation of the invention substantially is as follows:
System 1A is fully operational, filled with semisolid lubricant; the accumulation cylinder 9 is filled with semisolid lubricant taken from duct 3 in a previous cycle. Piston 102 is located at the left end of FIG. 1, with chamber 113 at the minimum volume thereof. Starting from these conditions, a lubrication cycle is carried out that will be illustrated with the aid of the solid line of diagram 3.

The pumping means 2 are put into operation and the pressure rises quite quickly up to pressure Pe where the injectors begin to dispense lubricant. When the pressure sensor 8 detects a pressure P2 (such as preset) slightly higher than the triggering pressure Pe of injectors 6, the pneumatic piston 10 is activated, thereby pushing the accumulation piston to dispense the amount of lubricant stored therein (such as 50 cc.). In fact, the accumulation piston dispenses the lubricant stored within duct 3, thereby 'aiding' the work of the pumping means 2. It follows that the slope of line E is greater than that which would be obtained with the pumping means 2 alone (dotted line).

After dispensing by all injectors 6, the pressure rises quickly up to the stabilization pressure Ps (which is the maximum pressure provided by the pumping means 2 and by the accumulation cylinder 9).

The pumping means 2 continue to work for a preset time at the maximum pressure, after which they are turned off. A slow decrease in pressure then slowly occurs in duct 3, substantially due to the 'recharge' effect of the injectors.

When the pressure sensor 8 detects a pressure drop in duct 3 below a second preset threshold P1 (for example 10 bar below the stabilization pressure Ps), the pneumatic cylinder recalls piston 102 and the accumulation cylinder sucks from duct 3 a part of the lubricant contained therein, thereby causing a fast decrease in pressure to a value at which it is possible to re-start the lubrication cycle.

As can be seen from the comparison between the dotted line (illustrating a cycle of a standard lubrication system) and the solid line representing a cycle of system 1A, a decrease is seen in the time needed to dispense the semisolid lubricant by all injectors 6, but above all a substantial decrease in the time related to the 'equalization' step of the system to return to the initial pressure conditions (e.g. 1 bar).

In essence, device 5 and the above method for controlling system 1A enables a significant reduction of the cycle times of the system itself, all to the advantage of the operation of the same.

The reduction of the cycle times allows the semisolid lubricant to minimise the saponification phenomena (since the lubricant stays for less time at high pressures). As additional effect, but nonetheless extremely important, the invention is useful in the filling steps of the system, where device 5 and the method shown above can be used effectively to reduce the time necessary to fill system 1A even by 50%.

Figure 3:
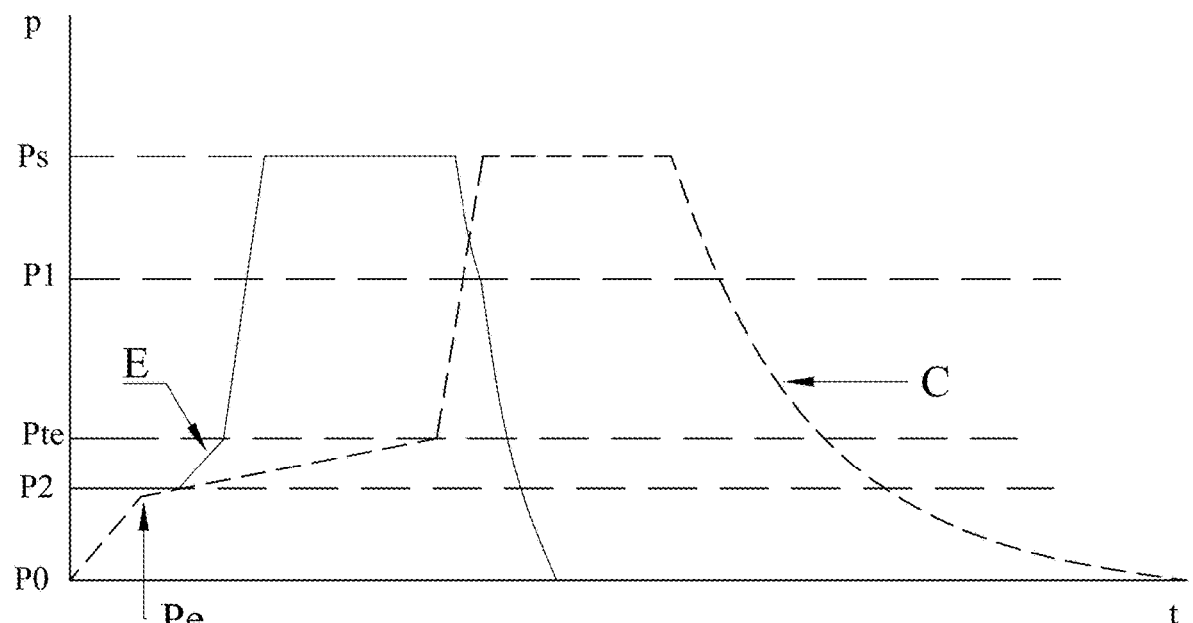
FIG. 3 is a simplified pressure/time graph illustrating the operation of the system in FIG. 2.

To end of the description of the graph in FIG. 3, it should be noted that it has been simplified compared to an actual cycle graph; this has the purpose of improving the understanding of the invention. In fact, the slope of the line associated with the product supply is constant, above pressure P2, only provided that the volume of lubricant stored in the accumulation cylinder is sufficient to dispense lubricant for the time required to activate injectors 6. Otherwise, once the amount present in the accumulation cylinder has ended, the slope of the line decreases, since in this case only the pumping means 2 push lubricant into duct 3.

In addition, all the lines in the graph are simplified, and especially that relating to the supply of the injectors, which actually has a sawtooth pattern.

It should be noted that in the schematic representation in FIG. 1, the pressure sensor comprises two pressure switches, one calibrated at pressure P1 and one calibrated at pressure P2. This is just one of the possible configurations, in which the pressure switches can be manually calibrated.

According to a more evolved embodiment, the intervention of device 5 can be fully managed by the control unit 107 and the pressure sensor 8 can be a simple transducer interfaced with control unit 107. A possible function of the control unit 107 may be that of self-learning of the triggering pressures P1 and P2. In essence, the system may run some cycles with device 5 idle so as to allow the control unit to detect the cycle pressures and independently set the triggering ones.

Associated with the control unit 107 is also possible to provide a screen, preferably touch screen, which can show the operating data of device 5 and allow the programming thereof.

Figure 4:
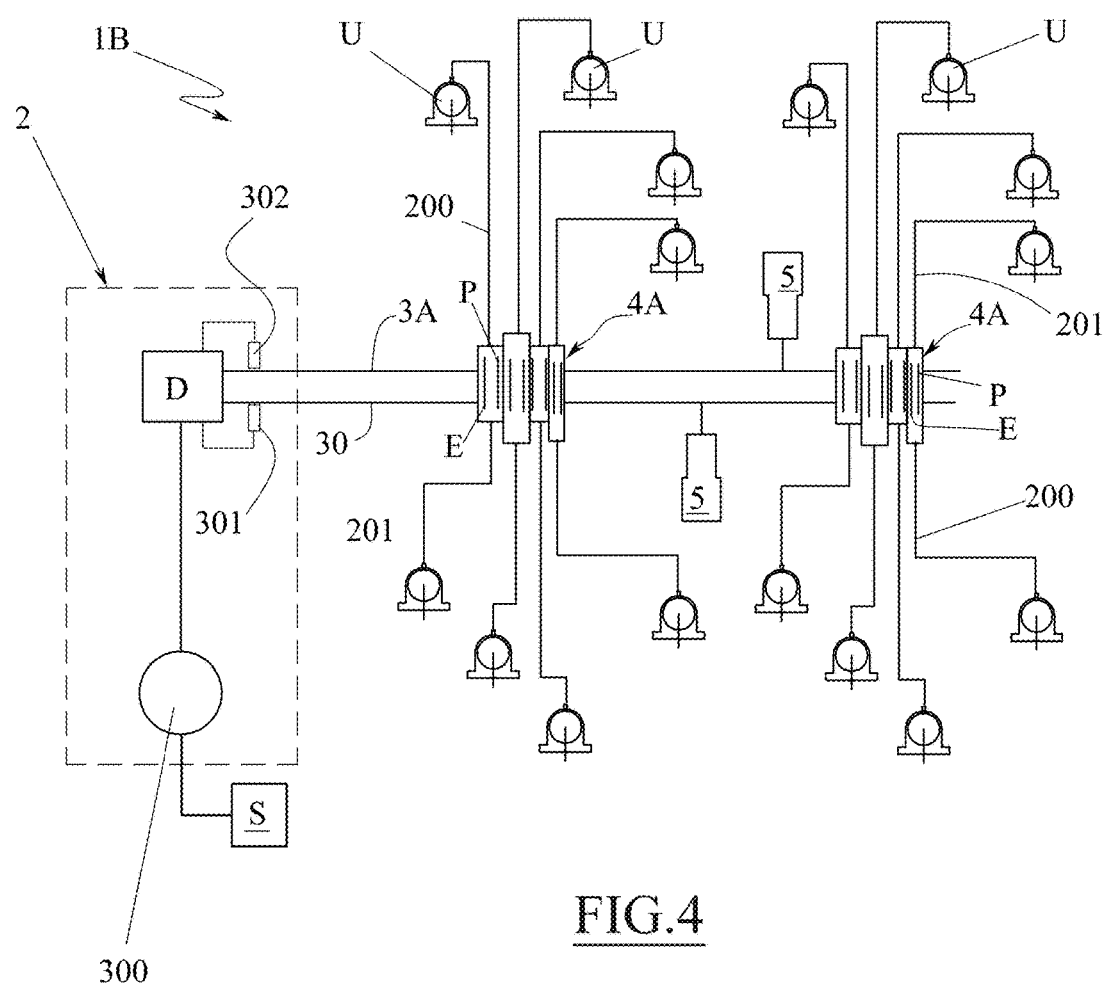
FIG. 4 is a schematic view of a second type of system according to the present invention integrating the component in FIG. 1.

A different but equally effective application of device 5 and of the method described above can be seen in a system 1B as that depicted in FIG. 4.

These types of systems are normally classified as double line lubrication systems.

In the description of such a system, the same reference numerals used above are used to denote parts functionally similar to those already described.

Specifically, in double line systems, there are two ducts 3A, 30 alternately supplied by the pumping means 2. In essence, when the first duct 3A is under pressure, the second duct 30 is not under pressure (and discharges towards tank S) and vice versa.

The alternation of pressurization of one duct or the other is carried out in a known manner by a divider D placed downstream of a high pressure pump 300. The divider is controlled by pressure switches 301, 302 associated with the first 3A and the second 30 duct.

Figure 5:
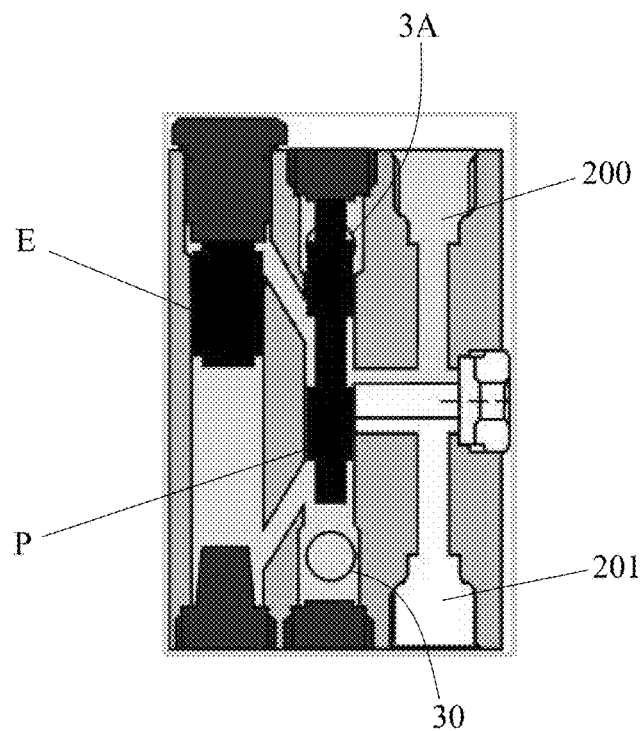
FIG. 5 is a schematic view of a volumetric distributor of the system in FIG. 4.

The first 3A and the second 4 duct feed a plurality of known modular volumetric distributors 4A. Each module is internally provided with a control piston P and a dispensing piston E. When duct 3A is under pressure, the pilot piston P is pushed towards the stroke end thereof (downwards in FIG. 5). In this position, the pilot piston P frees a passage that fills the upper chamber (again in FIG. 5) of the dosing piston. The grease present in the lower chamber is thus dispensed into duct 200 and conveyed to a user.

When all the dispensing pistons of the various modules have reached a stroke end, a pressure peak occurs into duct 3A detected by the pressure switch 302 which controls the divider so as to pressurize the second duct 4. in these conditions, line 3A is put into communication with the tank and thus depressurizes.

A pair of devices 5 as described above, associated to the first 3A and second 4 duct, respectively, operating according to logics similar to those already described, substantially accelerate both the pressurization steps of either duct and the depressurization steps of the same. This allows having the same advantages as described above also for this type of systems.

From the foregoing, it is apparent that the invention described relates to a method for controlling a system 1A, 1B for distributing semisolid lubricant, comprising a semisolid lubricant tank S and a high pressure pumping system 2 that intermittently feeds, during a lubrication cycle, at least one first duct 3, 3A, the at least one first duct feeding a plurality of distributors 4, 4A adapted to sort the semisolid lubricant to a plurality of users U, characterised by sucking from said first duct 3, 3A a volume of semisolid lubricant during a step of inactivity of the pumping system 2 on said first duct, and introducing the previously suctioned semisolid lubricant in said first duct 3, 3A during a step of activity of the pumping system 2 on said first duct.

The suction of the semisolid lubricant occurs when the pressure at a first point of the first duct 3, 3A falls below a first threshold value P1 and the introduction of semisolid lubricant occurs when the pressure at the first point of the first duct raises above a second threshold value P2.

Moreover, when pressure is lower than the second threshold value P2 or higher than the first threshold value P1, a controlled suction/delivery device 5 may be inactive.

In these inactivity conditions, a first and a second pressurizing port 11A, 11B of a pneumatic piston of the controlled suction/delivery device 5 can be closed.

Various embodiments of the invention have been described but others may be conceived using the same innovative concept.

The invention claimed is:

1. A system for distributing semisolid lubricant, comprising:
    a semisolid lubricant tank and a high pressure pumping system that intermittently feeds, during a lubrication cycle, at least one first duct, the at least one first duct feeding a plurality of distributors adapted to sort the semisolid lubricant to a plurality of users,
    a controlled suction/delivery device fluidly associated with said first duct, the controlled suction/delivery device having an accumulator cylinder configured for controlled suction/delivery of a part of the semisolid lubricant conveyed by said first duct,
    the controlled suction/delivery device being configured to suck a volume of semisolid lubricant from said first duct during a step of inactivity of the pumping system on said first duct and thereby fill a chamber of the accumulator cylinder, and then dispense the previously suctioned semisolid lubricant stored in the chamber of the accumulator cylinder and thereby introduce the previously suctioned semisolid lubricant in said first duct during a subsequent step of activity of the pumping system on said first duct,
    the controlled suction/delivery device comprising a pressure sensor functionally associated with said first duct and configured to control the suction/delivery device in its phases of sucking and of introducing the semisolid lubricant in said first duct based on pressure read by the sensor, wherein the accumulator cylinder is actuated by a movement system, wherein the movement system is a pneumatic cylinder.

2. The system according to claim 1, wherein the sensor is associated with a control unit of the controlled suction/delivery device, the control unit being configured to control the controlled suction/delivery device in its phases of sucking and of introducing the lubricant in said first duct based on pressure read by the sensor.

3. The system according to claim 2, wherein the control unit is configured to activate the suction of the semisolid lubricant when the pressure read by the sensor at a first point of the first duct falls below a first threshold value and to activate the introduction of the semisolid lubricant when the pressure read by the sensor at the first point of the first duct raises above a second threshold value.

4. The system according to claim 1, wherein each distributor supplies at least one volumetric injector with delivery of the at least one volumetric injector activated by the flow of semisolid lubricant at an inlet of the at least one volumetric injector.

5. The system according to claim 1, wherein the accumulator cylinder is actuated by a movement system and is configured to supply the semisolid lubricant directly to the distributor independent of the semisolid lubricant tank,
    wherein the plurality of distributors are arranged in series on the at least one first duct to be connected to the at least one first duct at a location thereon in between the controlled suction/delivery device and the semisolid lubricant tank,
    wherein the accumulator cylinder is in direct or indirect fluid communication with said first duct in a position spaced from the high pressure pumping system at one end of said first duct opposite another end of said first duct in which the high pressure pumping system is placed.

6. The system according to claim 5, wherein a ratio between a surface of the accumulator cylinder and a surface of the pneumatic cylinder is between 1:15 and 1:25.

7. The system according to claim 1, wherein a ratio between a surface of the accumulator cylinder and a surface of the pneumatic cylinder is between 1:15 and 1:35.

8. The system according to claim 7, wherein the pneumatic cylinder has, associated with a first and a second pressurization port, a flow regulator and/or a one-way valve and/or a valve for closing said first and second pressurization ports.

9. The system according to claim 8, wherein the pumping system comprises a divider for alternating supply of the first duct and a second duct that feed each volumetric distributor, each volumetric distributor comprising at least one pilot piston and a delivery piston integrated in the distributor.

10. The system according to claim 1, wherein the pumping system comprises a divider for alternating supply of the first duct and a second duct that feed each volumetric distributor, each volumetric distributor comprising at least one pilot piston and a delivery piston integrated in the distributor.

* * * * *